(12) United States Patent
Browder et al.

(10) Patent No.: US 12,443,421 B1
(45) Date of Patent: Oct. 14, 2025

(54) APPARATUS AND METHOD FOR GENERATING AN INTERACTIVE GRAPHICAL USER INTERFACE

(71) Applicant: Signet Health Corporation, North Richland Hills, TX (US)

(72) Inventors: Blake Browder, Dallas, TX (US); Joy Figarsky, Little Rock, AR (US)

(73) Assignee: Signet Health Corporation, North Richland Hills, TX (US)

( * ) Notice: Subject to any disclaimer, the term of this patent is extended or adjusted under 35 U.S.C. 154(b) by 0 days.

(21) Appl. No.: 19/191,391

(22) Filed: Apr. 28, 2025

Related U.S. Application Data

(63) Continuation of application No. 18/958,334, filed on Nov. 25, 2024, now Pat. No. 12,314,739.

(51) Int. Cl.
*G06F 9/451* (2018.01)
*G06F 9/54* (2006.01)

(52) U.S. Cl.
CPC .............. *G06F 9/451* (2018.02); *G06F 9/542* (2013.01); *G06F 2209/544* (2013.01)

(58) Field of Classification Search
CPC ..... G06F 9/451; G06F 9/542; G06F 2209/544
USPC ........................................................ 715/764
See application file for complete search history.

(56) References Cited

U.S. PATENT DOCUMENTS

| | | | |
|---|---|---|---|
| 11,587,683 B2 | 2/2023 | Frank et al. | |
| 12,164,940 B1* | 12/2024 | Weiss | G06F 3/0484 |
| 12,190,213 B2* | 1/2025 | Richter | G06F 9/451 |
| 2023/0008936 A1 | 1/2023 | Adhikari et al. | |
| 2023/0236892 A1* | 7/2023 | Weinstein | G06N 3/09 |
| | | | 718/104 |
| 2023/0409615 A1* | 12/2023 | Khemka | G06V 20/68 |
| 2024/0029501 A1* | 1/2024 | Donnell | G07F 17/3213 |
| 2024/0111408 A1* | 4/2024 | Reardon | G06F 3/0482 |
| 2024/0281698 A1* | 8/2024 | Richter | G06F 9/451 |
| 2024/0282300 A1* | 8/2024 | Odent | G10L 15/1815 |
| 2024/0346029 A1* | 10/2024 | Neumann | G06F 16/24575 |
| 2024/0370771 A1* | 11/2024 | Smith | G06Q 10/06 |
| 2024/0419412 A1* | 12/2024 | Serena | G06F 9/451 |

FOREIGN PATENT DOCUMENTS

| | | |
|---|---|---|
| CN | 110517781 A | 11/2019 |
| CN | 114898884 A | 8/2022 |

\* cited by examiner

*Primary Examiner* — William D Titcomb
(74) *Attorney, Agent, or Firm* — Caldwell Intellectual Property Law

(57) ABSTRACT

An apparatus and method for generating an interactive graphical user interface are disclosed. The apparatus includes a memory communicatively connected to at least a processor, wherein the memory contains instructions configuring the at least a processor to receive first input data and second input data, identify at least a target datum from the first input data, determine at least an operating parameter from the second input data as a function of the at least a target datum, generate a plurality of tasks as a function of the at least an operating parameter, generate an interactive graphical user interface, wherein generating the interactive graphical user interface includes receiving concurrent user actions for the plurality of task nodes from a plurality of user devices and updating the interactive graphical user interface as a function of the concurrent user actions using an adaptive mechanism.

20 Claims, 7 Drawing Sheets

APPARATUS AND METHOD FOR GENERATING AN INTERACTIVE GRAPHICAL USER INTERFACE

CROSS-REFERENCE TO RELATED APPLICATIONS

This application is a Continuation of U.S. Non-Provisional patent application Ser. No. 18/958,334, filed on Nov. 25, 2024, entitled "APPARATUS AND METHOD FOR GENERATING AN INTERACTIVE GRAPHICAL USER INTERFACE," the entirety of which is incorporated herein by reference.

FIELD OF THE INVENTION

The present invention generally relates to the field of graphical user interface. In particular, the present invention is directed to an apparatus and method for generating an interactive graphical user interface.

BACKGROUND

Traditional graphical user interfaces (GUIs) frequently lack the ability to adapt dynamically to varying network conditions, leading to inconsistent performance across devices. GUIs also lack mechanisms to dynamically adjust to changes in user behavior or environmental conditions, resulting in a less engaging user experience. Traditional GUIs may struggle to provide a consistent and intuitive interface across a range of use cases and settings.

SUMMARY OF THE DISCLOSURE

In an aspect, an apparatus for generating an interactive graphical user interface is disclosed. The apparatus includes at least a processor and a memory communicatively connected to the at least a processor, wherein the memory contains instructions configuring the at least a processor to receive first input data and second input data, identify, using the at least a processor, at least a target datum from the first input data, determine, using the at least a processor, at least an operating parameter from the second input data as a function of the at least a target datum, generate, using a task machine-learning model, a plurality of tasks as a function of the at least an operating parameter, and generate, using the at least a processor, an interactive graphical user interface as a function of the plurality of tasks, wherein each task node represents one task of the plurality of tasks and each task node comprises an input event handler of a plurality of input event handler and generating the interactive graphical user interface comprises identifying an interaction pattern as a function of user actions using an interaction pattern machine-learning model trained on training data comprising historical user action data, and generating the interactive graphical user interface as a function of the interaction pattern.

In another aspect, a method for generating an interactive graphical user interface is disclosed. The method includes receiving, using at least a processor, first input data and second input data, identifying, using the at least a processor, at least a target datum from the first input data, determining, using the at least a processor, at least an operating parameter from the second input data as a function of the at least a target datum, generating, using a task machine-learning model, a plurality of tasks as a function of the at least an operating parameter and generating, using the at least a processor, an interactive graphical user interface as a function of the plurality of tasks, wherein each task node represents one task of the plurality of tasks and each task node comprises an input event handler of a plurality of input event handler, and generating the interactive graphical user interface comprises identifying an interaction pattern as a function of user actions using an interaction pattern machine-learning model trained on training data comprising historical user action data, and generating the interactive graphical user interface as a function of the interaction pattern.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for generating an interactive graphical user interface are disclosed. The apparatus includes at least a processor and a memory communicatively connected to the at least a processor, wherein the memory contains instructions configuring the at least a processor to receive first input data and second input data, identify at least a target datum from the first input data, determine at least an operating parameter from the second input data as a function of the at least a target datum, generate a plurality of tasks as a function of the at least an operating parameter, wherein generating the plurality of tasks includes generating task training data, wherein the task training data includes exemplary operating parameters correlated to exemplary tasks, training a task machine-learning model using the task training data and generating the plurality of task using the trained task machine-learning model, generate an interactive graphical user interface as a function of the plurality of tasks, wherein the interactive graphical user interface includes an interactive data structure comprising a plurality of task nodes, wherein each task node represents one task of the plurality of tasks and each task node comprises an input event handler of a plurality of input event handlers and wherein generating the interactive graphical user interface includes receiving concurrent user actions at least partially through one of the plurality of input event handlers for the plurality of task nodes from a plurality of user devices, updating the interactive graphical user interface as a function of the concurrent user actions using an adaptive mechanism and wherein the adaptive mechanism is configured to accept or reject one user action of the concurrent user actions.

Aspects of the present disclosure can be used to dynamically adjust graphical user interfaces to changes in user behavior or environmental conditions. Aspects of the present disclosure can also be used to adjust graphical user interfaces timely and accurately.

Exemplary embodiments illustrating aspects of the present disclosure are described below in the context of several specific examples.

Figure 1:
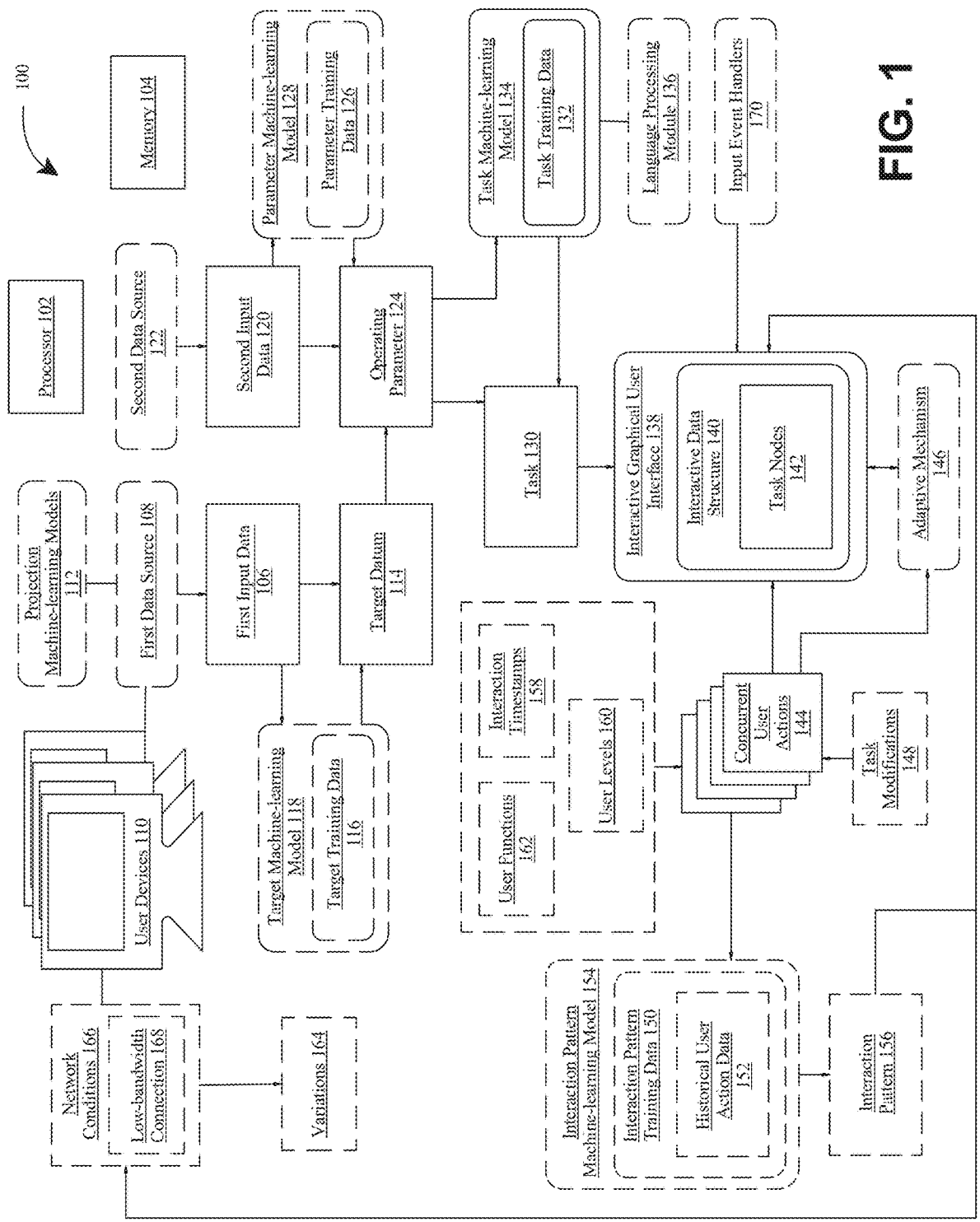
FIG. 1 illustrates a block diagram of an exemplary apparatus for generating an interactive graphical user interface.

Referring now to FIG. 1, an exemplary embodiment of an apparatus 100 for generating an interactive graphical user interface is illustrated. Apparatus 100 includes at least a processor 102. Processor 102 may include, without limitation, any processor described in this disclosure. Processor 102 may be included in a computing device. Processor 102 may include any computing device as described in this disclosure, including without limitation a microcontroller, microprocessor, digital signal processor (DSP) and/or system on a chip (SoC) as described in this disclosure. Processor 102 may include, be included in, and/or communicate with a mobile device such as a mobile telephone or smartphone. Processor 102 may include a single computing device operating independently, or may include two or more computing device operating in concert, in parallel, sequentially or the like; two or more computing devices may be included together in a single computing device or in two or more computing devices. Processor 102 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Processor 102 may include one or more computing devices dedicated to data storage, security, distribution of traffic for load balancing, and the like. Processor 102 may distribute one or more computing tasks as described below across a plurality of computing devices of computing device, which may operate in parallel, in series, redundantly, or in any other manner used for distribution of tasks or memory between computing devices. Processor 102 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 104 communicatively connected to processor 102. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 contains instructions configuring processor 102 to receive first input data 106. For the purposes of this disclosure, "first input data" is data from a first data source. In some embodiments, first input data 106 may include industry projection. As a non-limiting example, first input data 106 may include usage and financial projections for a new facility. As a non-limiting example, usage projections may include data about projected patient needs, which may influence the organization of a hospital unit. For the purposes of this disclosure, a "facility" is a physical location or building. As a non-limiting example, a facility may include hospital, factory, health care center, behavioral health center, and the like. For example, first input data 106 may represent collections of data related to hospital unit projections. For example, first input data 106 may represent a specific aspect of hospital operations, such as patient demand, staffing, equipment usage, financial metrics, and the like. In some embodiments, first input data 106 may include numerical and/or characteristic value. As a non-limiting example, first input data 106 may include a financial projection of revenue. As another non-limiting example, first input data 106 may include a usage projection of equipment in a facility. In an embodiment, first input data 106 may contain historical data, current performance metrics, or predictive data related to future operations. Additional examples may include predictive patient admission records, projected bed occupancy rates, departmental budgets, or resource allocation statistics. In an embodiment, first input data 106 may include geographical data, enabling the system to refine projections based on location-specific factors. Geographical data may include variables such as regional patient demographics, local healthcare resource availability, population density, seasonal patterns, and area-specific healthcare needs. For example, first input data 106 may include patient admission trends specific to urban or rural areas, variations in staffing requirements based on geographic regions, or regional budget constraints tied to local economic conditions. First input data 106 may include location-based variables such as the average travel distance for patients, availability of specialized care units within a region, or regional occupancy rates influenced by geographic healthcare demands.

With continued reference to FIG. 1, for the purposes of this disclosure, a "first data source" is a data source that transmits first input data to apparatus 100. As a non-limiting example, first data source 108 may include a first database, user device 110, projection machine-learning model 112, and the like. As used in this disclosure, "first database" is a data structure configured to store data associated with first input data. As a non-limiting example, first database may store first input data 106, and the like. In one or more embodiments, first database may include inputted or calculated information and datum related to first input data 106. In some embodiments, a datum history may be stored in first database. As a non-limiting example, the datum history may include real-time and/or previous inputted data related to first input data 106. As a non-limiting example, first database may include instructions from a user, who may be an expert user, a past user in embodiments disclosed herein, or the like, where the instructions may include examples of the data related to first input data 106.

With continued reference to FIG. 1, in some embodiments, processor 102 may be communicatively connected with first database. For example, and without limitation, in some cases, first database may be local to processor 102. In another example, and without limitation, first database may be remote to processor 102 and communicative with processor 102 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 102 connect directly, dynamically, and non-hierarchically to as many other computing devices as possible. A "network topology" as used in this disclosure is an arrangement of elements of a communication network. The network may use an immutable sequential listing to securely store first database. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, first database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, first data source 108 may include user device 110. In some embodiments, processor 102 may receive first input data 106 from user device 110. For the purposes of this disclosure, a "user device" is any device a user use to input data. For the purposes of this disclosure, a "user" is an individual or entity that uses or has used an apparatus 100. As a non-limiting example, user device 110 may include a laptop, desktop, tablet, mobile phone, smart phone, smart watch, kiosk, screen, smart headset, or things of the like. In some embodiments, user device 110 may include an interface configured to receive inputs from user. In some embodiments, user may manually input any data into apparatus 100 using user device 110. In some embodiments, user may have a capability to process, store or transmit any information independently.

With continued reference to FIG. 1, in some embodiments, receiving first input data 106 may include receiving an output of a plurality of projection machine-learning models 112. For the purposes of this disclosure, a "projection machine-learning model" is a machine-learning model that generates first input data. In a non-limiting example, projection machine-learning model 112 may be configured to generate usage projection or financial projection for a new facility. Additional disclosure related to projection machine-learning models 112 may be found in U.S. Nonprovisional patent application Ser. No. 18/958,471, filed on Nov. 25, 2024, and titled "APPARATUS AND METHOD FOR MACHINE-LEARNING MODEL OPTIMIZATION FOR DATA ATTRIBUTES," the entirety of which is incorporated as a reference.

With continued reference to FIG. 1, memory 104 contains instructions configuring processor 102 to identify at least a target datum 114 from first input data 106. For the purposes of this disclosure, a "target datum" is an element of data that includes the outcome that first input data aims to produce or achieve. As a non-limiting example, target datum 114 may include a specific revenue, number of new patients, time to complete a project or task, goal of business, percentage of growth, or the like. In some embodiment, target datum 114 may be stored in first data source 108. In some embodiments, target datum 114 may be retrieved from first data source 108. In some embodiments, user may manually input target datum 114 into processor 102.

With continued reference to FIG. 1, processor 102 is configured to generate target datum 114 as a function of first input data 106. In some embodiments, processor 102 may generate target datum 114 based on historical data. In a non-limiting example, target datum 114 may be a previously generated target datum. In some embodiments, processor 102 may generate target datum 114 through the use of machine-learning module. In some embodiments, processor 102 may be configured to generate target training data 116. In a non-limiting example, target training data 116 may include correlations between exemplary first input data and exemplary target data. In some embodiments, target training data 116 may be stored in first database. In some embodiments, target training data 116 may be received from one or more users, first database, external computing devices, and/or previous iterations of processing. As a non-limiting example, target training data 116 may include instructions from a user, who may be an expert user, a past user in embodiments disclosed herein, or the like, which may be stored in memory and/or stored in first database, where the instructions may include labeling of training examples. In some embodiments, target training data 116 may be updated iteratively on a feedback loop. As a non-limiting example, processor 102 may update target training data 116 iteratively through a feedback loop as a function of first input data 106, previously generated target datum, or the like. In some embodiments, processor 102 may be configured to generate target machine-learning model 118. In a non-limiting example, generating target machine-learning model 118 may include training, retraining, or fine-tuning target machine-learning model 118 using target training data 116 or updated target training data 116. In some embodiments, processor 102 may be configured to generate target datum 114 using target machine-learning model 118 (i.e. trained or updated target machine-learning model 118). In some embodiments, first input data 106 may be classified to a facility cohort using a cohort classifier. Cohort classifier may be consistent with any classifier discussed in this disclosure. Cohort classifier may be trained on cohort training data, wherein the cohort training data may include first input data 106 correlated to facility cohorts. In some embodiments, processor 102 may generate target datum 114 based on facility cohort using a machine-learning module as described in detail with respect to FIG. 3 and the resulting output may be used to update target training data 116. In some embodiments, generating training data and training machine-learning models may be simultaneous.

With continued reference to FIG. 1, in some embodiments, processor 102 may be configured to validate target datum 114. In some embodiments, processor 102 may receive a user input from a user device and validate target datum 114 as a function of the user input. For the purposes of this disclosure, a "user input" is any input that is input from a user device by a user. As a non-limiting example, user input may include a Boolean value (e.g., validate or invalidate). As another non-limiting example, user input may include a target datum modification. In some embodiments, processor 102 may only use target datum 114 that is validated. In some embodiments, processor 102 may use target datum 114 and if the processor 102 receives user input for validation, then the processor 102 may use target datum 114 that is validated; or if the target datum 114 is invalidated, then the processor 102 may regenerate target datum 114 or modify target datum 114 as a function of the user input. In some embodiments, user input may be stored in first database. In some embodiments, user input may be retrieved from first database. In some embodiments, processor 102 may feed target training data 116 with user input.

With continued reference to FIG. 1, memory 104 contains instructions configuring processor 102 to receive second input data 120. For the purposes of this disclosure, "second input data" is data from a second data source. As a non-limiting example, second input data 120 may include one or more regulatory metrics or parameters applicable to a facility. For example, and without limitation, in the context of healthcare, hospitals and healthcare facilities may be expected to adhere to a complex framework of regulations that govern their construction, maintenance, and operation to ensure safety, accessibility, and high-quality patient care. As a nonlimiting example, during construction, hospitals may meet standards outlined by organizations like the Joint Commission and American Society for Healthcare Engineering (ASHE), addressing building codes, materials, emergency systems, and patient safety. Hospitals may be expected to comply with the Americans with Disabilities Act (ADA) to ensure accessibility. Additionally, hospitals may be expected to comply with infection control measures, such as the Infection Control Risk Assessment (ICRA), to prevent contamination during construction and operation. Regulatory bodies may also require extensive ventilation and air quality standards (ASHRAE/ASHE Standard 170) to control airflow and minimize pathogen spread in healthcare settings. As another nonlimiting example, in terms of maintenance, hospital facilities may be expected to undergo regular inspections and maintenance in order to uphold safety protocols. This step may include managing environmental systems (such as without limitation HVAC) and maintaining infection control with equipment sterilization, as recommended by ASHE guidelines for healthcare facilities. Hospitals may be also expected to follow the Facility Guidelines Institute (FGI) standards to ensure that critical infrastructure, such as without limitation plumbing, power, and emergency systems are well-maintained. As another nonlimiting example, for operational compliance, hospitals may be expected to secure occupancy permits and undergo inspections to verify adherence to regulations, such as the Health Insurance Portability and Accountability Act (HIPAA), for patient privacy. Continuing with the same nonlimiting example, hospitals may be also expected to ensure that physical structures, such as without limitation walls and/or reception layouts, are capable of preventing unauthorized access to health information. The Centers for Medicare & Medicaid Services (CMS) may also require healthcare facilities to meet certain standards for patient safety and operational effectiveness to qualify for the federal reimbursement program. In some cases, such regulatory metrics (e.g., second input data 120) may be location specific and subject to laws, rules, and/or regulations at a federal, state, or city level. In some cases, such regulatory metrics may be time sensitive or time specific due to implementation, abolition, updates, or revisions of laws, rules, or regulations based on certain cutoff dates.

With continued reference to FIG. 1, for the purposes of this disclosure, a "second data source" is a data source that transmits second input data to apparatus 100. As a non-limiting example, second data source 122 may include a second database, user device 110, application programming interface (API), web crawler, and the like. As used herein, an "application programming interface" is a set of functions that allow applications to access data and interact with external software components, operating systems, or microdevices, such as another web application or computing device. As used in this disclosure, "second database" is a data structure configured to store data associated with second input data. As a non-limiting example, second database may store second input data 120, and the like. In one or more embodiments, second database may include inputted or calculated information and datum related to second input data 120. In some embodiments, a datum history may be stored in second database. As a non-limiting example, the datum history may include real-time and/or previous inputted data related to second input data 120. As a non-limiting example, second database may include instructions from a user, who may be an expert user, a past user in embodiments disclosed herein, or the like, where the instructions may include examples of the data related to second input data 120.

With continued reference to FIG. 1, in some embodiments, second input data 120 may be derived from a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 102 may generate web crawler to scrape second input data 120 from website. The web crawler may be seeded and/or trained with a reputable website to begin the search. Web crawler may be generated by processor 102. In some embodiments, web crawler may be trained with information received from user through a user interface. In some embodiments, web crawler may be configured to generate a web query. A web query may include search criteria received from user. For example, user may submit a plurality of websites for web crawler to search to second input data 120. Additionally, web crawler function may be configured to search for and/or detect one or more data patterns. A "data pattern" as used in this disclosure is any repeating forms of information. In some embodiments, web crawler may be configured to determine the relevancy of a data pattern. Relevancy may be determined by a relevancy score. A relevancy score may be automatically generated by processor 102, received from a machine learning model, and/or received from user. In some embodiments, a relevancy score may include a range of numerical values that may correspond to a relevancy strength of data received from a web crawler function. As a non-limiting example, a web crawler function may search the Internet for second input data 120.

With continued reference to FIG. 1, memory 104 contains instructions configuring processor 102 to determine at least an operating parameter 124 from second input data 120 as a function of at least a target datum 114. For the purposes of this disclosure, an "operating parameter" is a variable or factor within second input data that is related to a target datum. As a non-limiting example, operating parameter 124 may encompass particular rules, standards, or conditions relevant to target datum 114 of first input data 106. As a non-limiting example, operating parameter 124 within second input data 120 may include specific regulatory guidelines or compliance thresholds that directly impact target datum 114 in first input data 106. For instance, if first input data 106 includes a projection that a new hospital unit will serve a certain number of patients per month, operating parameter 124 within second input data 120 may include regulatory limits on patient-to-staff ratios, space allocation per patient, or required equipment per projected patient volume. In some embodiments, user may manually determine operating parameter from second input data 120.

With continued reference to FIG. 1, in some embodiments, processor 102 may be configured to generate parameter training data 126. In a non-limiting example, parameter training data 126 may include exemplary input data (e.g., first input data and second input data) and exemplary target data correlated to exemplary operation parameters. In some embodiments, parameter training data 126 may be stored in database. In some embodiments, parameter training data 126 may be received from one or more users, database, external computing devices, and/or previous iterations of processing. As a non-limiting example, parameter training data 126 may include instructions from a user, who may be an expert user, a past user in embodiments disclosed herein, or the like, which may be stored in memory and/or stored in database, where the instructions may include labeling of training examples. In some embodiments, parameter training data 126 may be updated iteratively on a feedback loop. As a non-limiting example, processor 102 may update parameter training data 126 iteratively through a feedback loop as a function of first input data 106, second input data 120, target datum 114, or the like. In some embodiments, processor 102 may be configured to generate parameter machine-learning model 128. In a non-limiting example, generating parameter machine-learning model 128 may include training, retraining, or fine-tuning parameter machine-learning model 128 using parameter training data 126 or updated parameter training data 126. In some embodiments, processor 102 may be configured to determine operating parameter 124 within second input data 120 using parameter machine-learning model 128 (i.e. trained or updated parameter machine-learning model 128). In some embodiments, generating training data and training machine-learning models may be simultaneous.

With continued reference to FIG. 1, memory 104 contains instructions configuring processor 102 to generate a plurality of tasks 130 as a function of at least an operating parameter 124. For the purposes of this disclosure, a "task" is a work or activity that needs to be accomplished. As a non-limiting example, task 130 may include specific actions, responsibilities, or workflows necessary to achieve compliance (operating parameter 124), or support projections (target datum 114) related to a new hospital unit. For example, and without limitation, task 130 may include activities such as staffing assessments, resource allocation, or infrastructure setup. For example, and without limitation, tasks 130 may include data-gathering activities; for instance, conducting patient volume forecasts or cost analyses, to refine projections (e.g., first input data 106). In some embodiments, task 130 may be stored in database and processor 102 may retrieve from database. In some embodiments, user may manually generate task 130.

With continued reference to FIG. 1, processor 102 is configured to generate task training data 132. In a non-limiting example, task training data 132 may include exemplary operating parameters correlated to exemplary tasks. In some embodiments, task training data 132 may be stored in database. In some embodiments, task training data 132 may be received from one or more users, database, external computing devices, and/or previous iterations of processing. As a non-limiting example, task training data 132 may include instructions from a user, who may be an expert user, a past user in embodiments disclosed herein, or the like, which may be stored in memory and/or stored in database, where the instructions may include labeling of training examples. In some embodiments, task training data 132 may be updated iteratively on a feedback loop. As a non-limiting example, processor 102 may update task training data 132 iteratively through a feedback loop as a function of first input data 106, second input data 120, target datum 114, operating parameter 124, output of machine-learning models described in this disclosure, or the like. Processor 102 is configured to generate task machine-learning model 134 using task training data 132. In a non-limiting example, generating task machine-learning model 134 may include training, retraining, or fine-tuning task machine-learning model 134 using task training data 132 or updated task training data 132. Processor 102 is configured to generate tasks 130 using task machine-learning model 134 (e.g., trained or updated task machine-learning model 134). In some embodiments, first input data 106 may be classified to a facility cohort using a cohort classifier. Cohort classifier may be consistent with any classifier discussed in this disclosure. Cohort classifier may be trained on cohort training data, wherein the cohort training data may include first input data 106 correlated to facility cohorts. In some embodiments, processor 102 may generate task 130 based on facility cohort using a machine-learning module as described in detail with respect to FIG. 3 and the resulting output may be used to update task training data 132. In some embodiments, generating training data and training machine-learning models may be simultaneous.

With continued reference to FIG. 1, in some embodiments, receiving a plurality of tasks 130 may include generating the plurality of tasks 130 using a language processing module 136. In some embodiments, task machine-learning model 134 may include a language processing module 136. For the purposes of this disclosure, a "language processing module" is a component designed to analyze, interpret, and process natural language input. Language processing module 136 may include any hardware and/or software module. Language processing module 136 may be configured to extract, from operating parameter 124, one or more words. One or more words may include, without limitation, strings of one or more characters, including without limitation any sequence or sequences of letters, numbers, punctuation, diacritic marks, engineering symbols, abbreviations, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams," where all sequences of n consecutive characters are considered. Any or all possible sequences of tokens or words may be stored as "chains," for example for use as a Markov chain or Hidden Markov Model.

Still referring to FIG. 1, language processing module 136 may operate to produce a language processing model. Language processing model may include a program automatically generated by processor 102 and/or language processing module 136 to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory 104 at processor 102, or the like.

Still referring to FIG. 1, language processing module 136 and/or processor 102 may generate the language processing model by any suitable method, including without limitation a natural language processing classification algorithm; language processing model may include a natural language processing that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module 136 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Alternatively or additionally, and with continued reference to FIG. 1, language processing module 136 may be produced using one or more large language models (LLMs). A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, as nonlimiting examples, medical report documents, electronic health records, entity documents, business documents, inventory documentation, emails, user communications, advertising documents, newspaper articles, governance and compliance documents, and the like. In some embodiments, training sets of an LLM may include information from one or more public or private databases. As a non-limiting example, training sets may include databases associated with a user, facility or regulation. In some embodiments, training sets may include portions of documents associated with the electronic records correlated to examples of outputs. In an embodiment, an LLM may include one or more architectures based on capability requirements of an LLM. Exemplary architectures may include, without limitation, GPT (Generative Pre-trained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include target datum 114 and operating parameter 124 correlated to examples of outputs such as tasks 130. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if some words that have already been typed are "Nice to meet," then it may be highly likely that the word "you" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

Still referring to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you," with "how" and "are." It's also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device 110. User device 110 may be any processor 102 that is used by a user. As non-limiting examples, user device 110 may include desktops, laptops, smartphones, tablets, and the like.

With continued reference to FIG. 1, an LLM may generate task 130 as an output. In some embodiments, an LLM may include multiple sets of transformer architecture as described above. Output may include a textual output. A "textual output," for the purposes of this disclosure is an output comprising a string of one or more characters. Textual output may include, for example, a plurality of tasks 130. In some embodiments, textual output may include a phrase or sentence identifying tasks 130. In some embodiments, textual output may include a sentence or plurality of sentences describing a response to a user query.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module 136 may use a corpus of documents to generate associations between language elements in a language processing module 136, and processor 102 may then use such associations to analyze words extracted from one or more documents and determine that the one or more documents indicate significance of a category. In an embodiment, language module and/or processor 102 may perform this analysis using a selected set of significant documents, such as documents identified by one or more experts as representing good information; experts may identify or enter such documents via interactive graphical user interface 138, or may communicate identities of significant documents according to any other suitable method of electronic communication, or by providing such identity to other persons who may enter such identifications into processor 102. Documents may be entered into a processor 102 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, processor 102 may automatically obtain the document using such an identifier, for instance by submitting a request to a database or compendium of documents such as JSTOR as provided by Ithaka Harbors, Inc. of New York.

With continued reference to FIG. 1, memory 104 contains instructions configuring processor 102 to generate an interactive graphical user interface (GUI) 138 as a function of an output of trained task machine-learning model 134. For the purposes of this disclosure, an "interactive graphical user interface" is an interface that facilitates engagement between a user and a system through graphical elements. As a non-limiting example, an interactive GUI 138 may include graphical elements such as buttons, icons, menus, sliders, or forms, which users can interact with to receive data, input data, modify displayed data, or initiate actions. In some embodiments, an interactive GUI 138 may enable data entry or selection activities. For instance, and without limitation, a user may allow to interact with graphical elements of interactive GUI 138. In some embodiments, interactive GUI 138 may be stored in a database, and a processor 102 may retrieve the interactive GUI 138 from the database. In some embodiments, users may manually customize or configure interactive GUI 138.

With continued reference to FIG. 1, for the purposes of this disclosure, a "user interface" is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the use interface using a computing device distinct from and communicatively connected to at least a processor 102. For example, a smart phone, smart, tablet, or laptop operated by a user. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, interactive graphical user interface 138 includes an interactive data structure 140 including a plurality of task nodes 142, wherein each task node 142 represents one task 130 of a plurality of tasks 130. For the purposes of this disclosure, an "interactive data structure" is a structured organization of data related to a plurality of tasks that allows interaction by users through an interface. In a non-limiting example, interactive data structure 140 may allow users to add, modify, delete, reorder, mark tasks as complete, or interact with elements. In some embodiments, interactive data structure 140 may include a graph, texts, checklist, and the like. For the purposes of this disclosure, a "task node" is an element within an interactive data structure, representing a task. As a non-limiting example, each task node 142 of a plurality of task nodes 142 may include relevant data for one task 130. For instance, and without limitation, each task node 142 may include task identifiers, descriptions, assigned personnel, due dates, and the like. In some embodiments, task nodes 142 may be linked or organized hierarchically within interactive data structure 140.

With continued reference to FIG. 1, generating interactive graphical user interface 138 includes receiving concurrent user actions 144 for a plurality of task nodes 142 from a plurality of user devices 110, updating the interactive graphical user interface 138 as a function of the concurrent user actions 144 using an adaptive mechanism 146, wherein the adaptive mechanism 146 is configured to accept or reject one user action 144 of the concurrent user actions 144. For the purposes of this disclosure, a "user action" is an action related to an interactive graphical user interface initiated by a user. For the purposes of this disclosure, "concurrent user actions" refers to actions initiated by multiple users on separate user devices. In some embodiments, concurrent user actions 144 may be actions initiated by multiple users on separate user devices 110 at overlapping or nearly simultaneous times. In a non-limiting example, concurrent user actions 144 may be directed at interactive graphical user interface 138, interacting with a plurality of task nodes 142 within interactive data structure 140. In some embodiments, concurrent user actions 144 may include task modifications 148. For the purposes of this disclosure, "task modification" is any change or update applied to a task within an interactive data structure by a user. As a non-limiting example, task modifications 148 may include marking tasks 130 in each task node 142 as complete, reordering tasks 130 or task nodes 142, updating task details in task nodes 142, or assigning tasks 130 to other users.

With continued reference to FIG. 1, in some embodiments, processor 102 may be configured to generate interaction pattern training data 150. In a non-limiting example, interaction pattern training data 150 may include historical user action data 152. For the purposes of this disclosure, "historical user action data" is collection of previous user actions. As a non-limiting example, historical user action data 152 may include previous concurrent user actions. For example, and without limitation, historical user action data 152 may include records of task modifications 148; for instance, marking tasks 130 or task nodes 142 as complete, updating task details, or reordering tasks 130. For example, and without limitation, historical user action data 152 may include navigation patterns; for instance, timing, frequency and sequence of accessing specific tasks 130 or task nodes 142. In another non-limiting example, interaction pattern training data 150 may include correlations between exemplary user actions and exemplary interaction patterns. In some embodiments, interaction pattern training data 150 may be stored in database. In some embodiments, interaction pattern training data 150 may be received from one or more users, database, external computing devices, and/or previous iterations of processing. As a non-limiting example, interaction pattern training data 150 may include instructions from a user, who may be an expert user, a past user in embodiments disclosed herein, or the like, which may be stored in memory and/or stored in database, where the instructions may include labeling of training examples. In some embodiments, interaction pattern training data 150 may be updated iteratively on a feedback loop. As a non-limiting example, processor 102 may update interaction pattern training data 150 iteratively through a feedback loop as a function of historical user action data 152, concurrent user actions 144, tasks 130, output of machine-learning models described in this disclosure, or the like. In some embodiments, processor 102 may be configured to generate interaction pattern machine-learning model 154. In a non-limiting example, generating interaction pattern machine-learning model 154 may include training, retraining, or fine-tuning interaction pattern machine-learning model 154 using interaction pattern training data 150 or updated interaction pattern training data 150. In some embodiments, processor 102 may be configured to determine an interaction pattern 156 using interaction pattern machine-learning model 154 (i.e. trained or updated interaction pattern machine-learning model 154). For the purposes of this disclosure, an "interaction pattern" is a recurring sequence or identifiable trend of users engaging with tasks. As a non-limiting example, interaction pattern 156 may include frequency, sequence, and/or type of tasks 130 or task nodes 142 users perform or interact within interactive graphical user interface 138. For example, and without limitation, interaction pattern 156 may include sequences such as frequently accessed tasks 130, repeated modifications to certain task nodes 142, preferred methods of input (e.g., clicking, dragging, or voice commands), and the like. For example, and without limitation, interaction pattern 156 may show that a user consistently prioritizes specific task categories, such as high-priority items, or tends to check certain task details multiple times throughout the day. In some embodiments, interaction patterns 156 may be identified and stored as part of historical user action data 152, allowing a processor 102 to analyze the interaction patterns 156 to predict user preferences and adjust or update interactive data structure 140. In some embodiments, processor 102 may generate interactive data structure 140 as a function of interaction pattern 156 (e.g., an output of interaction pattern machine-learning model 154). In some embodiments, generating training data and training machine-learning models may be simultaneous.

With continued reference to FIG. 1, for the purposes of this disclosure, an "adaptive mechanism" is a mechanism that dynamically processes and manages concurrent user actions on an interactive graphical user interface. In some embodiments, adaptive mechanism 146 may evaluate each user action of concurrent user actions 144 and determine whether to accept, modify, or reject the user action based on criteria. As a non-limiting example, the criteria may include order of interaction timestamp 158, user level 160, user function 162, task priority, and the like. In some embodiments, the adaptive mechanism 146 may include a set of predefined rules or machine learning algorithms to assess relevance and impact of each concurrent user action 144, thereby resolving conflicts and updating the interactive graphical user interface 138 accordingly. By dynamically adapting to the context of each concurrent user action 144, the adaptive mechanism 146 can ensure that interactive graphical user interface 138 remains consistent and up-to-date across all user devices 110.

With continued reference to FIG. 1, updating interactive graphical user interface 138 may include updating the interactive graphical user interface 138 as a function of interaction timestamps 158 of concurrent user actions 144 using adaptive mechanism 146, wherein a user action of the concurrent user actions 144 with a latest timestamp may be prioritized. For the purposes of this disclosure, an "interaction timestamp" is a time indicator associated with each user action of concurrent user actions. In a non-limiting example, interaction timestamp 158 may include exact date and time at which a concurrent user action 144 occurs, providing a reference point for determining a sequence and/or priority of concurrent user actions 144. In some embodiments, interaction timestamp 158 may be used by an adaptive mechanism 146 to prioritize user actions based on recency, enabling processor 102 to accept, modify, or reject user actions 144 of concurrent user actions 144. For example, and without limitation, if two users simultaneously update the same task 130 or task node 142 within interactive data structure 140, adaptive mechanism 146 may refer to each user action's interaction timestamp 158, prioritizing the user action 144 with the most recent interaction timestamp 158 to maintain data consistency and prevent conflicting updates. In some embodiments, interaction timestamps 158 may be stored in a database as part of historical user action data 152.

With continued reference to FIG. 1, in some embodiments, concurrent user actions 144 may be transmitted and received in a form of data packets. For the purposes of this disclosure, a "data packet" is a discrete unit of data that contains both information being transferred, "payload," and a "header" with metadata necessary for routing, sequencing, and reassembly. In some embodiments, header may include details such as a source and destination addresses, error-checking information, sequence numbers, and, a packet timestamp. The packet timestamp disclosed in this disclosure may be consistent with interaction timestamps 158. Packet timestamp may serve as a time marker for each data packet (e.g., concurrent user action 144), recording precise time at which concurrent user actions 144 like sending, receiving, or forwarding occur. For the purposes of this disclosure, "packet timestamping" refers to tracking a data packet's journey through a network. As a non-limiting example, packet timestamping may track data packets as timestamps may be added by an "originating node" (sender), a "receiving node" (recipient), or any "intermediary nodes" (e.g., routers or switches) handling the data packets along their route. In some embodiments, by referencing packet timestamps (interaction timestamps 158), processor 102 may determine an order of concurrent user actions 144. For example, and without limitation, if multiple users perform user actions simultaneously, processor 102 may use packet timestamps to determine which user action took place first, regardless of an arrival sequence. In some embodiments, packet timestamps of intermediary nodes may allow pinpointing where delays occur within a network. In a non-limiting example, if a data packet encounters a delay at an intermediary router or switch, each node's timestamp may include information of a specific point of delay and processor 102 may identify a cause of delay and latency (e.g., network congestion, hardware limitations, or specific routing paths) and may improve network performance as a function of the identification. These may be consistent with synchronization of task modifications 148 of concurrent user actions 144 described below.

With continued reference to FIG. 1, in some embodiments, updating interactive graphical user interface 138 may include updating the interactive graphical user interface as a function of user functions 162 using adaptive mechanism 146, wherein a user action of concurrent user actions 144 from a user device 110 of a plurality of user devices 110 with a user function 162 associated with a plurality of tasks 130 is prioritized. For the purposes of this disclosure, a "user function" is a designation of a user based on user's department, or area of expertise within an organization or facility. As a non-limiting example, user function 162 may include financial management, operations, compliance, human resources, or other specialized fields. For example, and without limitation, users in a department that is related to the context of task 130 in a task node 142 may be prioritized. In a non-limiting example, if interactive data structure 140 within interactive graphical user interface 138 includes tasks 130 related to budget approval or expense tracking, user actions 144 from users in a financial department may be prioritized due to their alignment with the task's context. In a non-limiting example, when multiple users from different departments modify the same task node 142, adaptive mechanism 146 may prioritize user actions 144 by users with a user function 162 closely aligned to the task's purpose. In some embodiments, user functions 162 may be stored in a database.

With continued reference to FIG. 1, in some embodiments, updating interactive graphical user interface 138 may include updating the interactive graphical user interface 138 as a function of user levels 160 using adaptive mechanism 146, wherein a user action of the concurrent user actions 144 from a user device 110 of a plurality of user devices 110 with a higher user level is prioritized. For the purposes of this disclosure, a "user level" is a hierarchical designation indicating a level of authority, responsibility, or privilege associated with a user. As a non-limiting example, user level 160 may be related to a user's role, title, or designated responsibility within an organization or facility. For example, and without limitation, a manager or administrator may have a higher user level than a team member or regular user. In some embodiments, user level 160 may include access privileges, where users with higher levels have broader permissions or control over specific elements or task nodes 142 within interactive data structure 140. In some embodiments, processor 102 may determine priority and influence of user actions taken by different users as a function of user level 160 when concurrent task modifications 148 are made to interactive graphical user interface 138. In a non-limiting example, higher user levels may have precedence over lower user levels. For instance, and without limitation, if both a manager and a team member attempt to update same task 130 or task node 142 within the interactive data structure 140 simultaneously (e.g., concurrent user actions 144), adaptive mechanism 146 may prioritize the manager's action based on the higher user level. In some embodiments, user levels 160 may be stored within a database and retrieved by processor 102.

With continued reference to FIG. 1, in some embodiments, updating interactive graphical user interface 138 may include synchronizing task modifications 148 of concurrent user actions 144 across a plurality of user devices 110. In a non-limiting example, when multiple users make task modifications 148 at the same or nearly the same time, processor 102 may ensure that all user devices 110 display updated task 130 consistently. For example, and without limitation, if one user marks a task as complete in a task node 142 while another user reassigns the same task 130 to a different team member, processor 102 manage these concurrent user action 144 (task modifications 148), resolving any conflicts and updating each user's interactive graphical user interface 138 in real-time to reflect a final state of the task 130. In some embodiments, processor 102 may receive all task modifications 148 from concurrent user actions 144, prioritize or sequence them based on predefined rules (adaptive mechanism 146), and update task nodes 142 of interactive data structure 140 across all user devices 110.

With continued reference to FIG. 1, in some embodiments, updating interactive graphical user interface 138 may include detecting variations 164 in network conditions 166 of a plurality of user devices 110, wherein detecting the variations 164 may include identifying at least one user device 110 with low-bandwidth connection 168 among the plurality of user devices 110 and dynamically adjusting synchronization of task modifications 148 by modifying a frequency of the synchronization for the at least one user device 110 in the low-bandwidth connection 168. For the purposes of this disclosure, "network conditions" refer to a current state and quality of network connectivity of a plurality of user devices interacting with an apparatus 100. As a non-limiting example, network conditions 166 may include factors such as bandwidth availability, latency, signal strength, packet loss, and overall network stability. In some embodiments, network conditions 166 can vary across user devices 110, where multiple users access interactive graphical user interface 138 from different locations or networks. For the purposes of this disclosure, a "low-bandwidth connection" is a network state where data transmission capacity is limited, resulting in slower data transfer speeds. In a non-limiting example, user devices 110 on low-bandwidth connections 168 may experience delays or interruptions in receiving and sending data (e.g., updates on interactive graphical user interface 138). As a non-limiting example, low-bandwidth connections 168 may include limited internet speeds, network congestion, or weak signal strength. For the purposes of this disclosure, "variations" in network conditions refer to differences or changes in network connectivity quality of each user device of a plurality of user devices. In some embodiments, variations 164 in network conditions 166 may result from differences in user location, network type (e.g., Wi-Fi, cellular), or network provider performance. For the purposes of this disclosure, "synchronization" of task modifications is a process of updating all instances of a task across multiple user devices to reflect any changes made by users. In a non-limiting example, synchronization of task modifications 148 may include real-time propagation of updates to task status, details, or sequence across all user devices 110 to maintain data consistency.

With continued reference to FIG. 1, in some embodiments, updating interactive graphical user interface 138 may include detecting variations 164 in network conditions 166 across multiple user devices 110 by identifying user devices 110 operating under a low-bandwidth connection 168, which may result in delayed or interrupted data transfers. In some embodiments, processor 102 may identify user devices 110 operating under a low-bandwidth connection 168 by measuring download and upload speeds of each user device 110. As a non-limiting example, processor 102 may send small packets of data to user devices 110 and measure the time taken to receive responses. In some embodiments, predefined low bandwidth thresholds can be used to identify user devices 110 operating under a low-bandwidth connection 168, where any user device 110 falling below this threshold may be flagged as having a low-bandwidth connection 168. When a low-bandwidth condition is detected for at least one user device 110, processor 102, using adaptive mechanism 146, may dynamically adjust the synchronization of task modifications 148 to optimize performance by modifying a frequency of synchronization for the affected user device 110. For example, and without limitation, updates to interactive graphical user interface 138 on the affected user device 110 may be transmitted less frequently or with fewer data packets to prevent overloading the connection.

With continued reference to FIG. 1, each task node 142 includes an input event handler 170 of a plurality of input event handlers 170. Generating interactive graphical user interface 138 includes receiving concurrent user actions 144 at least partially through one of plurality of input event handlers 170 for a plurality of task nodes 142 from a plurality of user devices 110. In some embodiments, interactive GUI 138 may include one or more input event handlers 170. An "input event handler" as used in this disclosure is a callback routine that operates asynchronously once an event takes place. Input event handlers 170 may include, without limitation, one or more programs to perform one or more actions based on user input (concurrent user actions 144), such as generating pop-up windows, submitting forms, changing background colors of a webpage, and the like. Input event handlers 170 may be programmed for specific user input, such as, but not limited to, mouse clicks, mouse hovering, touchscreen input, keystrokes, and the like. For instance and without limitation, an input event handler 170 may be programmed to generate a pop-up window if a user double clicks on a specific icon. User input (concurrent user action 144) may include a manipulation of computer icons, such as, but not limited to, clicking, selecting, dragging and dropping, scrolling, and the like. In some embodiments, user input (concurrent user action 144) may include an entry of characters and/or symbols in a user input field. A "user input field" as used in this disclosure is a portion of a graphical user interface configured to receive data from an individual. A user input field may include, but is not limited to, text boxes numerical fields, search fields, filtering fields, and the like. In some embodiments, user input may include touch input. Touch input may include, but is not limited to, single taps, double taps, triple taps, long presses, swiping gestures, and the like. One of ordinary skill in the art will appreciate the various ways a user may interact with interactive GUI 138.

Figure 2:
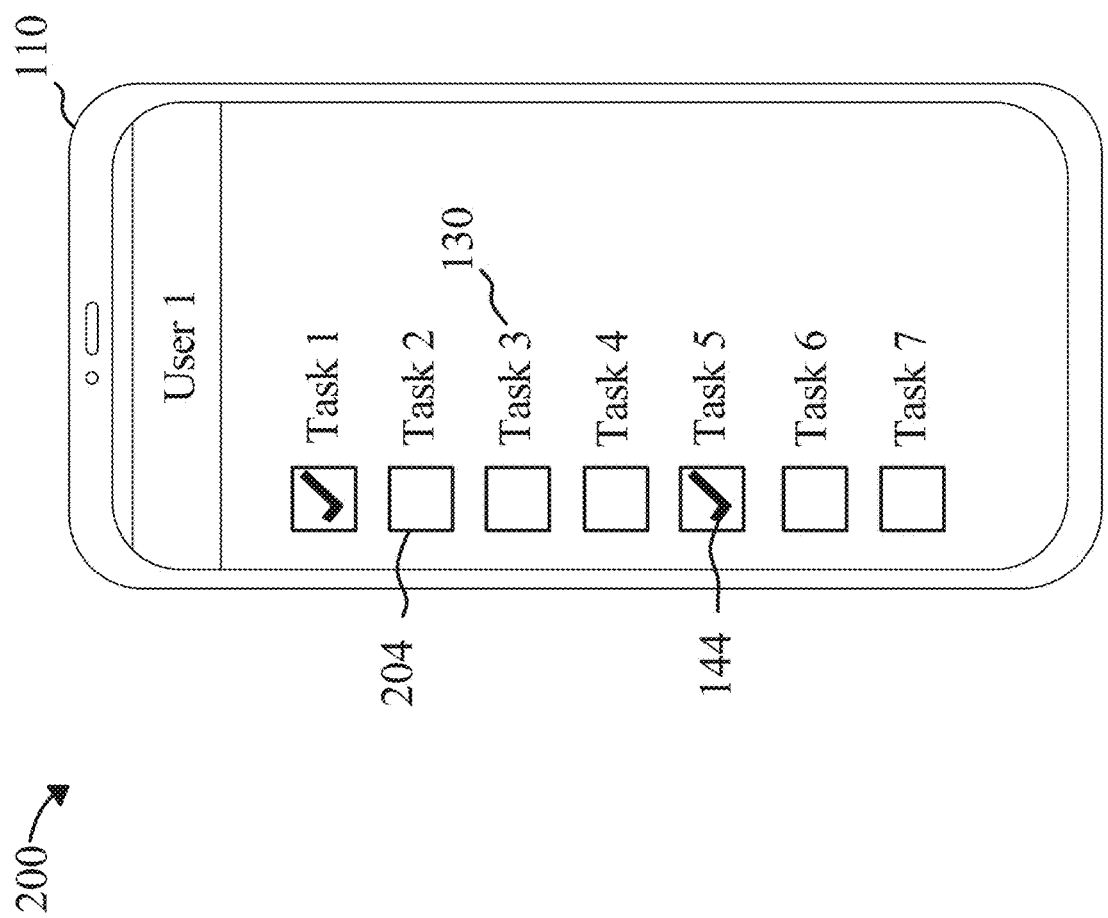
FIG. 2 illustrates an exemplary interactive graphical user interface on a user device.

Referring now to FIG. 2, an exemplary interactive graphical user interface 200 on a user device 110. As a non-limiting example, user device 110 may include a laptop, desktop, tablet, mobile phone, smart phone, smart watch, kiosk, screen, smart headset, or things of the like. In some embodiments, interactive data structure 140 may include a graph, texts, checklist 204, and the like. In some embodiment, checklist 204 may include a list of tasks 130 for users. In some embodiments, user may input user actions 144 using interactive graphical user interface 200. For example, and without limitation, user may check (e.g., user action 144) a checkbox of checklist 204.

Figure 3:
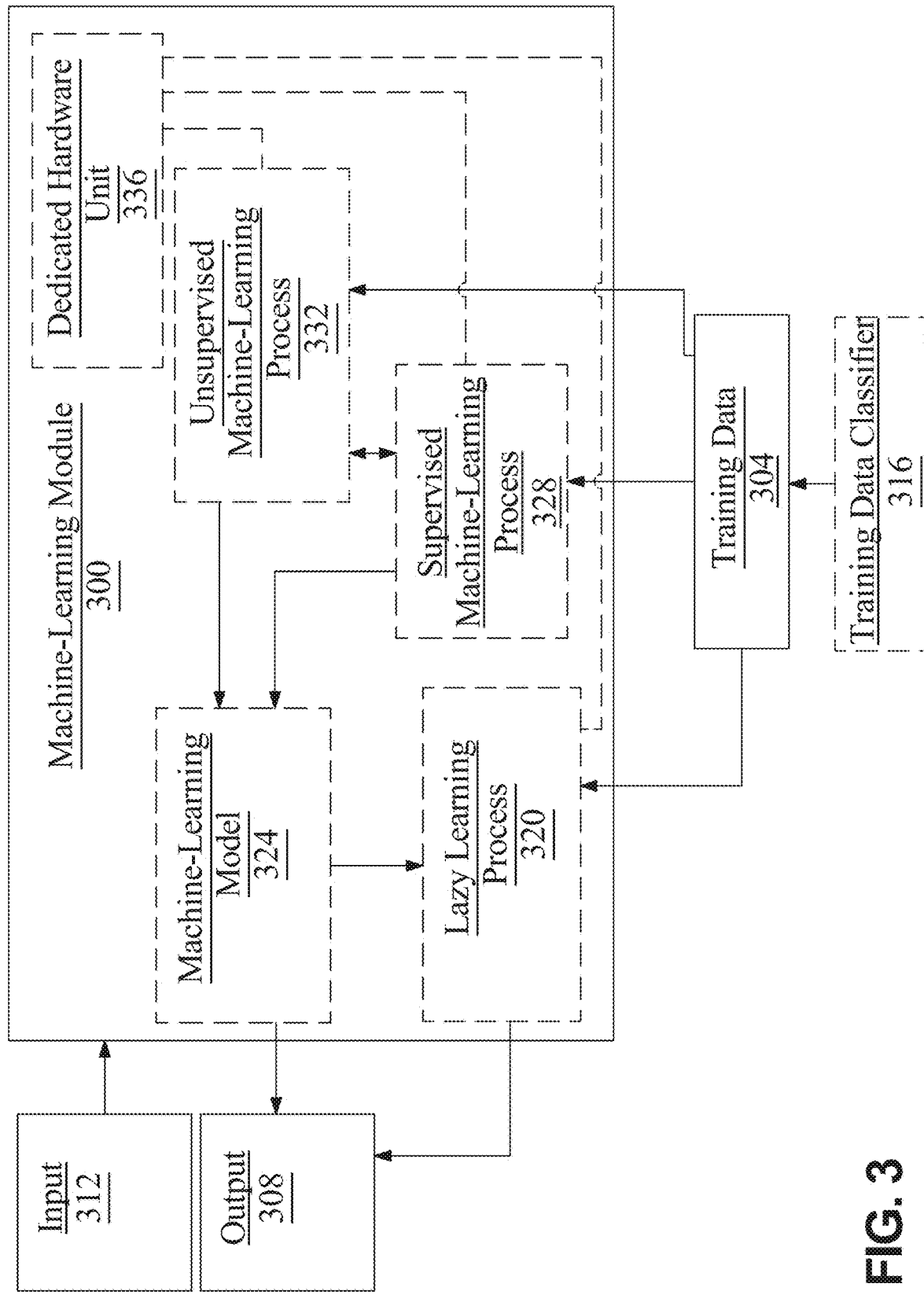
FIG. 3 illustrates a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include first input data 106, second input data 120, operating parameter 124, target datum 114, concurrent user actions 144, and the like. As a non-limiting illustrative example, output data may include operating parameter 124, target datum 114, interactive data structure 140, and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to a facility cohort related to a facility's location, field, industry, size, and the like. As another non-limiting example, training data classifier 316 may classify elements of training data to a user cohort related to a user's role, department, level, and the like.

Still referring to FIG. 3, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)±P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to Each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will IQR be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include first input data 106, second input data 120, operating parameter 124, target datum 114, concurrent user actions 144, and the like as described above as inputs, operating parameter 124, target datum 114, interactive data structure 140, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
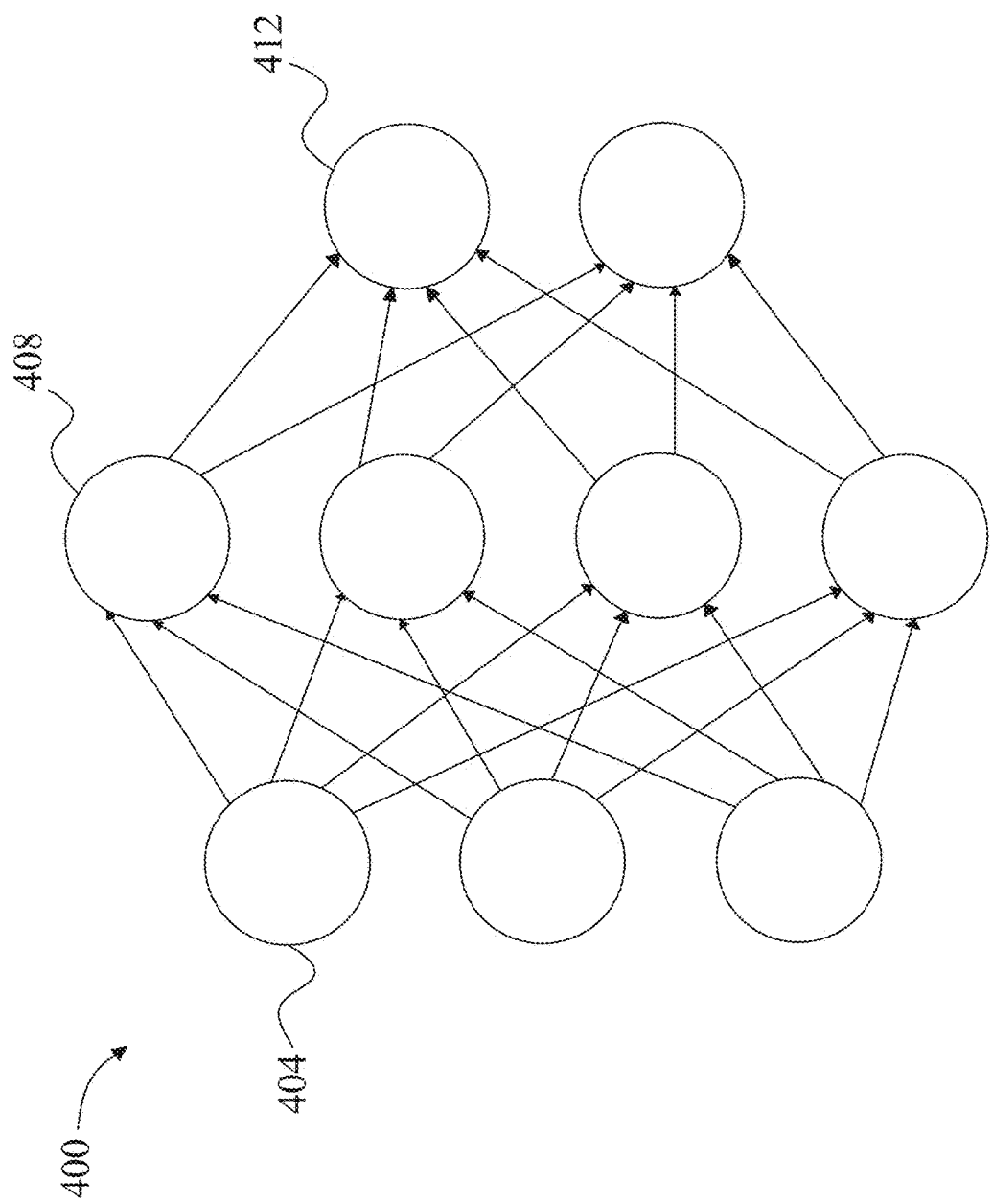
FIG. 4 illustrates a diagram of an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
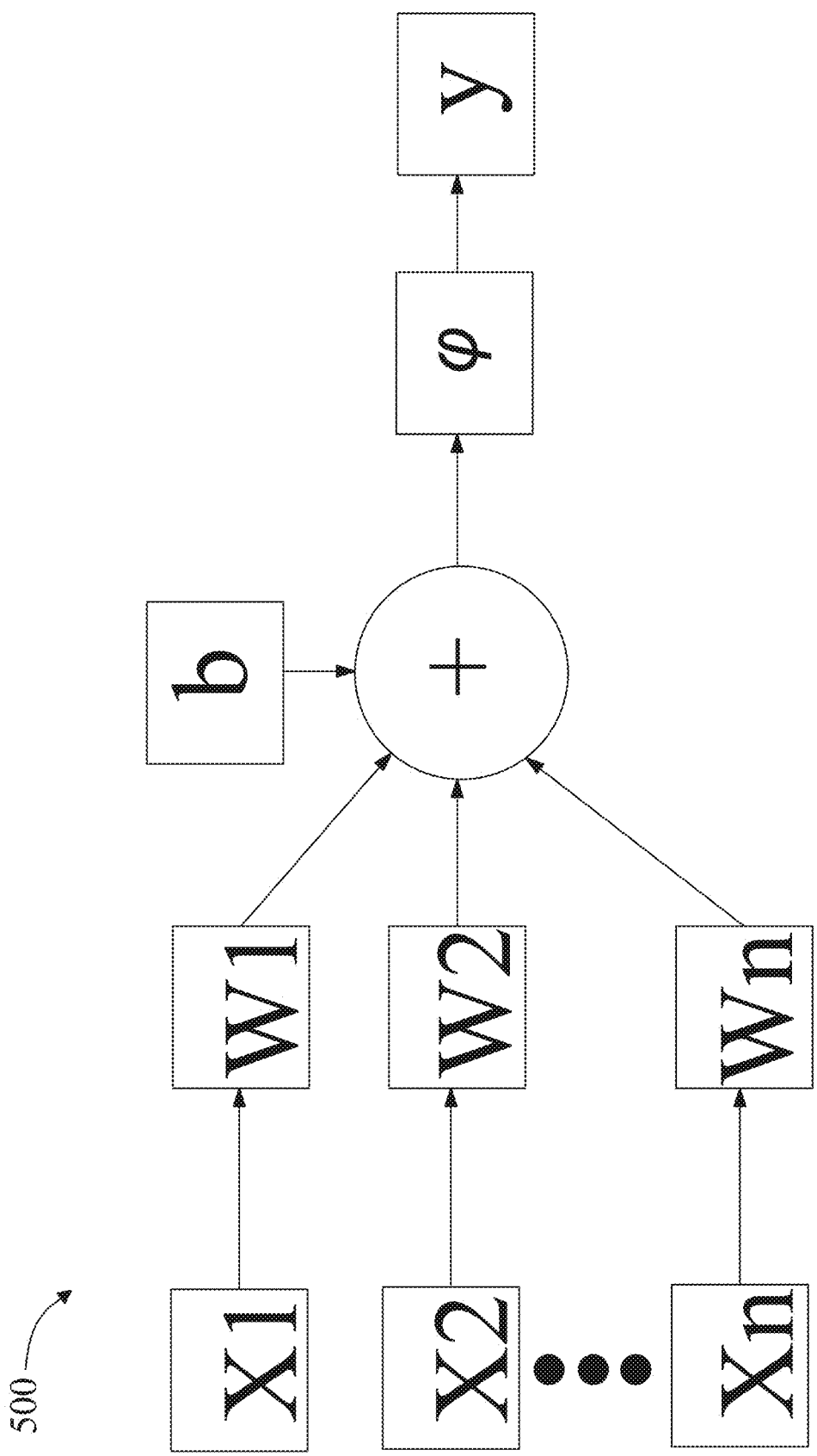
FIG. 5 illustrates a block diagram of an exemplary node in a neural network.

Referring now to FIG. 5 an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
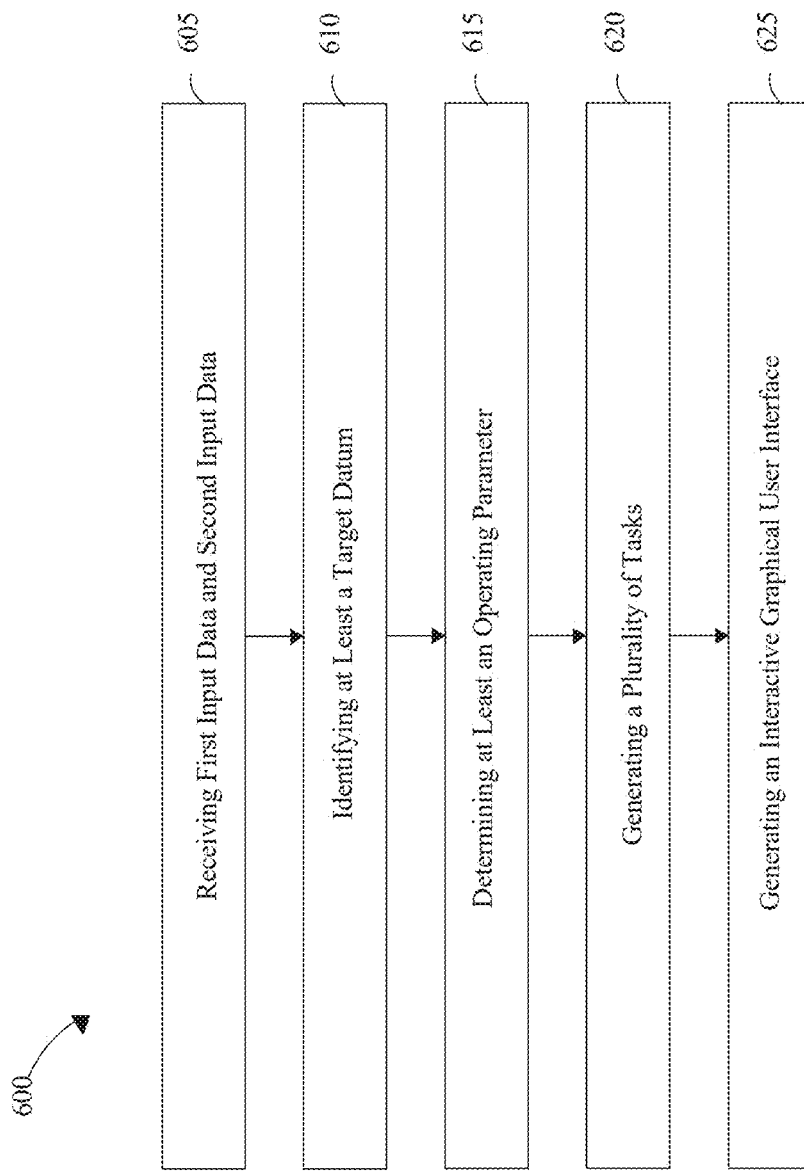
FIG. 6 illustrates a flow diagram of an exemplary method for generating an interactive graphical user interface.

Referring now to FIG. 6, a flow diagram of an exemplary method 600 for generating an interactive graphical user interface is illustrated. Method 600 contains a step 605 of receiving, using at least a processor, first input data and second input data. In some embodiments, receiving the first input data may include receiving an output of a plurality of projection machine-learning models, wherein the plurality of projection machine-learning models may be configured to generate the first input data. These may be implemented as reference to FIGS. 1-5.

With continued reference to FIG. 6, method 600 contains a step 610 of identifying, using at least a processor, at least a target datum from first input data. This may be implemented as reference to FIGS. 1-5.

With continued reference to FIG. 6, method 600 contains a step 615 of determining, using at least a processor, at least an operating parameter from second input data as a function of at least a target datum. In some embodiments, determining the at least an operating parameter may include generating parameter training data, wherein the parameter training data may include exemplary input data and exemplary target data correlated to exemplary operating parameters, training a parameter machine-learning model using the parameter training data and determining the at least an operating parameter using the trained parameter machine-learning model. These may be implemented as reference to FIGS. 1-5.

With continued reference to FIG. 6, method 600 contains a step 620 of generating, using at least a processor, a plurality of tasks as a function of at least an operating parameter, wherein generating the plurality of tasks includes generating task training data, wherein the task training data includes exemplary operating parameters correlated to exemplary tasks, training a task machine-learning model using the task training data and generating the plurality of tasks using the trained task machine-learning model. In some embodiments, generating the plurality of tasks may include generating the plurality of tasks using a language processing module. These may be implemented as reference to FIGS. 1-5.

With continued reference to FIG. 6, method 600 contains a step 625 of generating, using at least a processor, an interactive graphical user interface as a function of a plurality of tasks, wherein the interactive graphical user interface includes an interactive data structure including a plurality of task nodes, wherein each task node represents one task of a plurality of tasks and each task node comprises an input event handler of a plurality of input event handlers and generating the interactive graphical user interface includes receiving concurrent user actions at least partially through one of the plurality of input event handlers for the plurality of task nodes from a plurality of user devices and updating the interactive graphical user interface as a function of the concurrent user actions using an adaptive mechanism, wherein the adaptive mechanism is configured to accept or reject one user action of the concurrent user actions. In some embodiments, generating the interactive graphical user interface may include training an interaction pattern machine-learning model using historical user action data, identifying an interaction pattern as a function of the concurrent user actions using the trained interaction pattern machine-learning model and generating the interactive data structure as a function of the interaction pattern. In some embodiments, updating the interactive graphical user interface may include updating the interactive graphical user interface as a function of interaction timestamps of the concurrent user actions using the adaptive mechanism, wherein a user action of the concurrent user actions with a latest timestamp may be prioritized. In some embodiments, updating the interactive graphical user interface may include updating the interactive graphical user interface as a function of user levels using the adaptive mechanism, wherein a user action of the concurrent user actions from a user device of the plurality of user devices with a higher user level may be prioritized. In some embodiments, updating the interactive graphical user interface may include updating the interactive graphical user interface as a function of user functions using the adaptive mechanism, wherein a user action of the concurrent user actions from a user device of the plurality of user devices with a user function associated with the plurality of tasks may be prioritized. In some embodiments, updating the interactive graphical user interface may include synchronizing task modifications of the concurrent user actions across the plurality of user devices. In some embodiments, updating the interactive graphical user interface may include detecting variations in network conditions of the plurality of user devices, wherein detecting the variations may include identifying at least one user device with low-bandwidth connection among the plurality of user devices and dynamically adjusting the synchronization by modifying a frequency of the synchronization for the at least one user device in the low-bandwidth condition. These may be implemented as reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
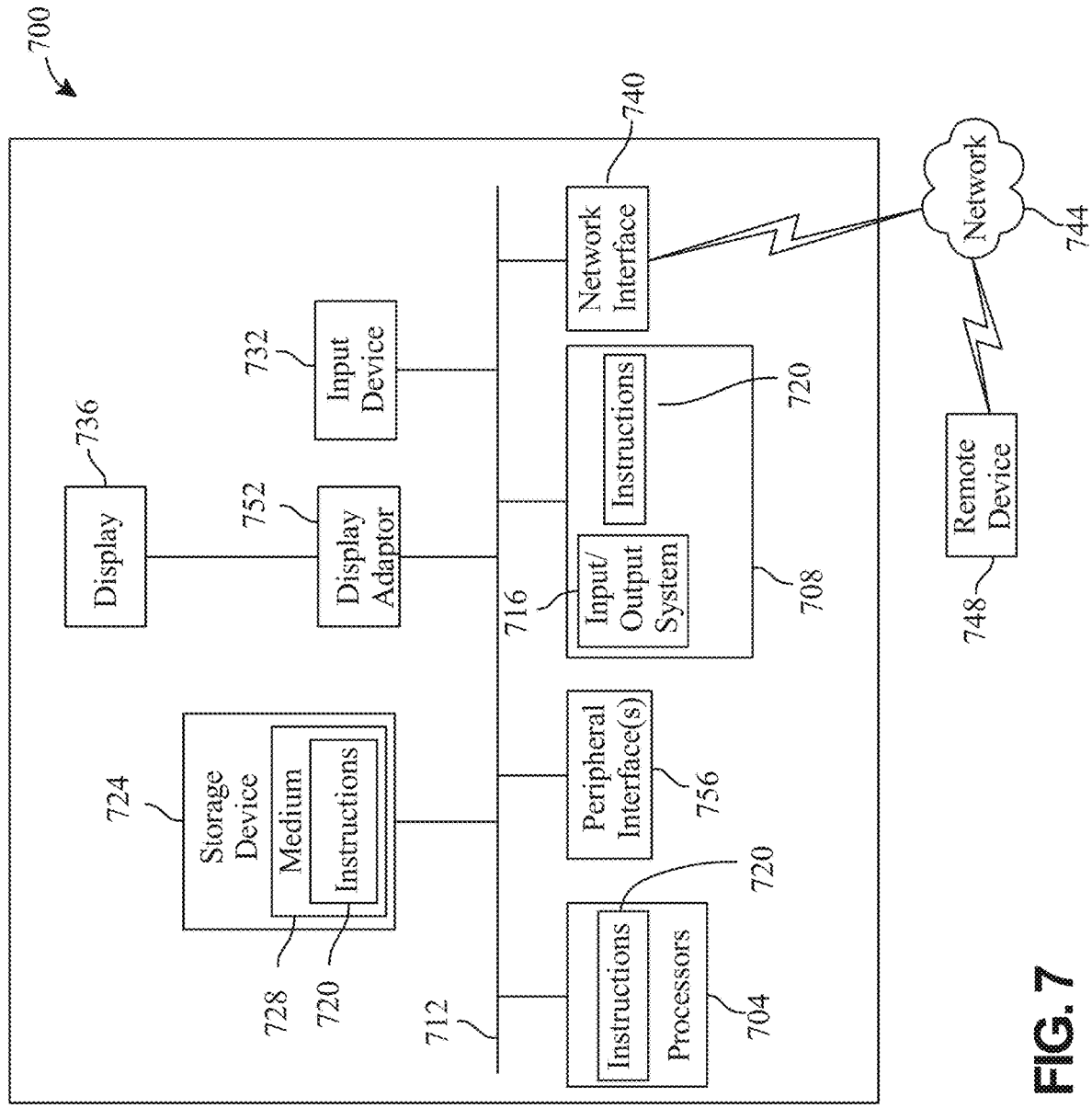
FIG. 7 illustrates a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and memory 708 that communicate with each other, and with other components, via a bus 712. Bus 712 may include any of several types of bus structures including, but not limited to, memory bus, memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating an interactive graphical user interface, the apparatus comprising:
   at least a processor; and
   a memory communicatively connected to the at least a processor, wherein the memory contains instructions configuring the at least a processor to:
      receive first input data and second input data;
      identify, using the at least a processor, at least a target datum from the first input data;
      determine, using the at least a processor, at least an operating parameter from the second input data as a function of the at least a target datum;
      generate, using a task machine-learning model, a plurality of tasks as a function of the at least an operating parameter; and
      generate, using the at least a processor, an interactive graphical user interface as a function of the plurality of tasks, wherein:
         each task node represents one task of the plurality of tasks and each task node comprises an input event handler of a plurality of input event handler; and
         generating the interactive graphical user interface comprises:
            identifying an interaction pattern as a function of user actions using an interaction pattern machine-learning model trained on training data comprising historical user action data; and
            generating the interactive graphical user interface as a function of the interaction pattern.

2. The apparatus of claim 1, wherein generating the plurality of tasks comprises:
   generating task training data, wherein the task training data comprises exemplary operating parameters correlated to exemplary tasks;
   training the task machine-learning model using the task training data, wherein the task machine-learning model comprises a language processing module; and
   generating the plurality of tasks using the trained task machine-learning model.

3. The apparatus of claim 2, wherein the at least a processor is further configured to iteratively update, using a feedback loop, the task training data.

4. The apparatus of claim 1, wherein the at least an operating parameter comprises at least a compliance threshold associated with the target datum.

5. The apparatus of claim 1, wherein the at least a processor generates each task of the plurality of tasks based on a facility cohort using a machine-learning module.

6. The apparatus of claim 1, wherein generating the interactive graphical user interface comprises:
   receiving concurrent user actions at least partially through one of the plurality of input event handlers for the plurality of task nodes from a plurality of user devices; and
   updating the interactive graphical user interface as a function of the concurrent user actions using an adaptive mechanism.

7. The apparatus of claim 6, wherein the adaptive mechanism is configured to evaluate user action of the concurrent user actions wherein evaluating the user action comprises one or more of accepting, modifying, and the user action.

8. The apparatus of claim 6, wherein updating the interactive graphical user interface comprises updating the interactive graphical user interface as a function of interaction timestamps of the concurrent user actions using the adaptive mechanism.

9. The apparatus of claim 6, wherein updating the interactive graphical user interface comprises updating the interactive graphical user interface as a function of user functions using the adaptive mechanism.

10. The apparatus of claim 1, wherein the plurality of tasks comprise data-gathering activities.

11. A method for generating an interactive graphical user interface, the method comprising:
    receiving, using at least a processor, first input data and second input data;
    identifying, using the at least a processor, at least a target datum from the first input data;
    determining, using the at least a processor, at least an operating parameter from the second input data as a function of the at least a target datum;
    generating, using a task machine-learning model, a plurality of tasks as a function of the at least an operating parameter; and
    generating, using the at least a processor, an interactive graphical user interface as a function of the plurality of tasks, wherein:
        each task node represents one task of the plurality of tasks and each task node comprises an input event handler of a plurality of input event handler; and
        generating the interactive graphical user interface comprises:
            identifying an interaction pattern as a function of user actions using an interaction pattern machine-learning model trained on training data comprising historical user action data; and
            generating the interactive graphical user interface as a function of the interaction pattern.

12. The method of claim 11, wherein generating the plurality of tasks comprises:
    generating task training data, wherein the task training data comprises exemplary operating parameters correlated to exemplary tasks;
    training the task machine-learning model using the task training data, wherein the task machine-learning model comprises a language processing module; and
    generating the plurality of tasks using the trained task machine-learning model.

13. The method of claim 12, further comprising iteratively updating, using a feedback loop, the task training data.

14. The method of claim 11, wherein the at least an operating parameter comprises at least a compliance threshold associated with the target datum.

15. The method of claim 11, further comprising generating, using the at least a processor, each task of the plurality of tasks based on a facility cohort using a machine-learning module.

16. The method of claim 11, wherein generating the interactive graphical user interface comprises:
    receiving concurrent user actions at least partially through one of the plurality of input event handlers for the plurality of task nodes from a plurality of user devices; and
    updating the interactive graphical user interface as a function of the concurrent user actions using an adaptive mechanism.

17. The method of claim 16, wherein the adaptive mechanism is configured to evaluate user action of the concurrent user actions wherein evaluating the user action comprises one or more of accepting, modifying, and the user action.

18. The method of claim 16, wherein updating the interactive graphical user interface comprises updating the interactive graphical user interface as a function of interaction timestamps of the concurrent user actions using the adaptive mechanism.

19. The method of claim 16, wherein updating the interactive graphical user interface comprises updating the interactive graphical user interface as a function of user functions using the adaptive mechanism.

20. The method of claim 11, wherein the plurality of tasks comprise data-gathering activities.

* * * * *